Dec. 21, 1965     E. REGELSON     3,225,242
INFRARED CALIBRATION LAMP
Filed May 3, 1963
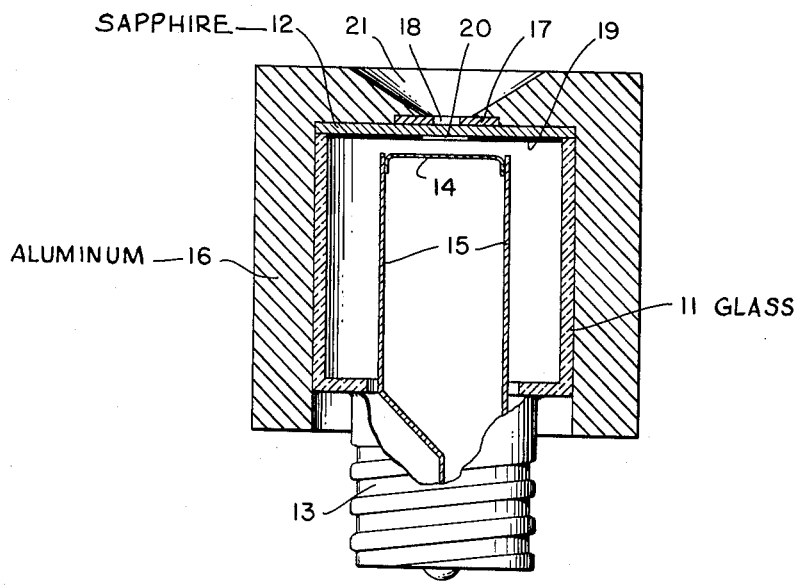
INVENTOR.
EPHRAIM REGELSON
BY
*C. H. First*
ATTORNEY.

United States Patent Office 3,225,242
Patented Dec. 21, 1965

3,225,242
INFRARED CALIBRATION LAMP
Ephraim Regelson, China Lake, Calif., assignor to the United States of America as represented by the Secretary of the Navy
Filed May 3, 1963, Ser. No. 277,962
5 Claims. (Cl. 313—110)
(Granted under Title 35, U.S. Code (1952), sec. 266)

The invention described herein may be manufactured and used by or for the Government of the United States for governmental purposes without the payment of any royalties thereon or therefor.

The present invention relates to an infrared calibration source unit which is particularly designed when used with suitable optics to serve as a secondary calibration standard for various infrared systems.

Some infrared sources in common use include the Globar, the Welsbach mantle, the Nernst glower, carbon rods and the tungsten filament. These sources are often bulky, require complicated regulators and consume a considerable amount of power. A Globar is difficult to use under exposed conditions and the tungsten light bulb is spectrally inadequate for many applications because of absorption by glass and of the shape of the filament. These devices have not proved entirely satisfactory under all conditions of service. The general purpose of the present invention is to provide a device which will serve the need for a small, economical, reliable and stable source of infrared radiation.

An object of the present invention is the provision of an infrared calibration source unit for field use where environmental conditions make it difficult to use laboratory type standards.

Another object is to provide an infrared source light small enough to serve as an internal reference source for radiometric equipment.

A further object of this invention is the provision of a unit readily adaptable for use with collimator mirrors or lenses where space is a premium.

Still another object is to provide an infrared calibration source unit which offers a combination of accuracy, small size, ruggedness, and low cost.

Other objects, advantages and novel features of the invention will become apparent from the following detailed description of the invention when considered in conjunction with the accompanying drawing wherein:

The single figure is a schematic representation of an embodiment of this invention.

Referring now to the single figure there is shown the infrared source unit of this invention, built much as a standard light bulb, wherein numeral 11 designates an evacuated cylinder about 1″ in diameter composed of glass, aluminum or other suitable material. The top end of cylinder 11 is sealed by a sapphire disk 12 about 1″ in diameter and about .020″ thick, and the bottom end is provided with base 13 (of standard light bulb size) for connection to an electrical source. Sealed within cylinder 11 is an alloy ribbon filament 14 mounted on metal support means 15 which are adapted to be connected to base 13. Fitted around cylinder 11 is a cup-shaped housing 16, which supports a metal disk or plate 17 atop the sapphire disk 12. Plate 17 is formed with a centrally located aperture 18 ranging in size from .0015″ to .100″ diameter. The inside surface 19 of sapphire disk 12 is coated with an oxidizing-resistant material, such as "Inconel," except for a circular area designated by numeral 20 which is slightly larger than aperture 18 and constitutes a void in the coating. Area 20 is positioned opposite aperture 18 and both are in alignment with filament 14. The infrared source is effective through an angle determined by aperture 18 and area 20. The top of housing 16 is provided with a frusto-conical bore 21 in which plate 17 is seated.

Filament 14 may be of any of the well known commercial alloy ribbons such as Nichrome which contains nickel, iron, chromium and carbon, or Chromel A, another alloy composed of nickel and chromium, or an equivalent material. The filament used in this apparatus was Nichrome ribbon ½″ long, ¼″ wide and .003″ thick and is positioned as close as possible without touching the top end of the cylinder as this determines the angular efficiency of the light source unit.

Housing 16 acts as a heat sink and may be made of aluminum or any suitable material. Aperture 18 may be precision machined into the top of the housing 16, thereby eliminating the necessity for the plate or disk 17.

Disk 12 used to seal the cylinder may be of any other suitable infrared transmitting material such as quartz, sapphire, etc., and may be coated with any of the oxidizing-resistant materials used in photo etch material techniques. "Inconel" used in this invention is a trade-mark for an alloy of approximately 78% nickel, 15% chromium and 6% iron which has good resistance to oxidization at elevated temperatures.

The operating temperature for this calibration lamp or infrared source unit is from 25° to 1000° C. Above the higher temperature the unit will not hold its calibration because of excessive oxidation or aging. The electrical power for operating this apparatus may be any regulated source of alternating current or a battery. About 40 watts of power are required to achieve a temperature of 1000° C., and the present apparatus will reach a stable operating temperature in about ten seconds. The greater the current flow, the higher the source temperature. Accurate measurements of current flow can and should be monitored with a standard current measuring meter. The device is calibrated as to temperature and emissivity by comparing its output against a known infrared radiation standard. The low operating temperature and the vacuum or inert gas environment of the vessel or cylinder will minimize changes in the source radiation characteristics but the calibration should be rechecked periodically and especially if operated at temperatures exceeding 1000° C. The calibration should also be rechecked for use under all environmental conditions. The sapphire disk sealing the top of the cylinder or vessel can be used as a reference source in the 1–5 micron spectral range. Quartz is suitable up to about 3½ microns.

A larger filament would make possible the use of larger apertures in the housing plate and sapphire disk, but would require more power. Shaping the ribbon filament by bending it into a V-shaped trough will improve emissivity, but will reduce the aperture size possible.

The present apparatus warms up quickly and makes it suitable for intermittent use. This characteristic not only would serve to conserve power, but would reduce the need for an efficient housing or heat sink.

It will be apparent that the embodiment shown is only exemplary and that various modifications can be made in construction materials, and arrangement within the scope of the invention as defined in the appended claims.

What is claimed is:
1. An infrared calibration apparatus comprising in combination:
   a cylindrical vessel having two ends;
   a housing disposed around said vessel;
   an electrical source base sealed to one end of said vessel and adapted to be connected through said housing to a source of electrical power;
   a disk composed of infrared transmitting material sealed to the other end of said vessel forming a closed vessel;

an alloy filament mounted within the vessel;
means for supporting said filament to said source base;
said housing having an aperture in the top positioned in alignment with said filament;
an oxidizing resistant material coating a portion of the inside of said disk leaving a void area opposite the aperture in said housing;
said aperture and said void area positioned in alignment with said filament whereby the infrared radiation is effective through an angle determined by the aperture and void area.

2. The apparatus as set out in claim 1 wherein the housing is composed of aluminum.

3. The apparatus as set out in claim 1 wherein the vessel is composed of glass.

4. The apparatus as set out in claim 1 wherein the disk is composed of sapphire.

5. An infrared calibration source unit which serves as a secondary calibrating standard for infrared systems comprising:
 a glass cylinder having a sapphire disk mounted in sealing relation at one end and a base member positioned in a sealing relation at the other end adapted for connection to an electrical source;
 an alloy filament mounted within said cylinder adjacent to said disk;
 means for supporting said filament adapted to be connected to said base;
 a cup-shaped metal housing disposed around said cylinder having a bore at the top; and
 a plate seated in said bore having an aperture positioned in alignment with said filament through which infrared radiation passes when the filament is heated by an electrical source.

References Cited by the Examiner

UNITED STATES PATENTS

| 2,952,762 | 9/1960 | Williams et al. | 219—553 X |
| 3,138,697 | 6/1964 | Banca et al. | 219—553 X |

FOREIGN PATENTS 1,042,624  11/1953  France.

GEORGE N. WESTBY, *Primary Examiner.*

D. E. SRAGOW, *Assistant Examiner.*